United States Patent
Jia et al.

(10) Patent No.: US 11,010,301 B2
(45) Date of Patent: May 18, 2021

(54) METHOD, APPARATUS, AND COMPUTER PROGRAM PRODUCT FOR PROVIDING CACHE SERVICE

(71) Applicant: EMC IP Holding Company LLC, Hopkinton, MA (US)

(72) Inventors: Ruiyong Jia, Beijing (CN); Xinlei Xu, Beijing (CN); Lifeng Yang, Beijing (CN); Yousheng Liu, Beijing (CN); Changyu Feng, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/572,929

(22) Filed: Sep. 17, 2019

(65) Prior Publication Data
US 2020/0133867 A1 Apr. 30, 2020

(30) Foreign Application Priority Data
Oct. 30, 2018 (CN) .......................... 201811278408.X

(51) Int. Cl.
*G06F 12/0873* (2016.01)
*G06F 12/1045* (2016.01)
*G06F 12/0891* (2016.01)

(52) U.S. Cl.
CPC ...... *G06F 12/0873* (2013.01); *G06F 12/0891* (2013.01); *G06F 12/1054* (2013.01); *G06F 12/1063* (2013.01); *G06F 2212/6012* (2013.01)

(58) Field of Classification Search
CPC ............. G06F 12/0873; G06F 12/1054; G06F 12/1063
See application file for complete search history.

(56) References Cited

U.S. PATENT DOCUMENTS

| | | | |
|---|---|---|---|
| 9,069,783 B1 | 6/2015 | Bono | |
| 9,430,480 B1 | 8/2016 | Bono | |
| 10,521,137 B1 | 12/2019 | Xu et al. | |
| 10,810,123 B1 | 10/2020 | Xu et al. | |
| 2019/0324677 A1* | 10/2019 | Oe | .......... G06F 3/0604 |
| 2019/0377681 A1* | 12/2019 | Hodes | ................. G06F 12/0246 |

* cited by examiner

*Primary Examiner* — Edward J Dudek, Jr.
(74) *Attorney, Agent, or Firm* — BainwoodHuang

(57) ABSTRACT

Techniques provide cache service in a storage system. Such techniques involve a storage cell pool, a cache and an underlying storage system. The storage cell pool includes multiple storage cells, a storage cell among the multiple storage cells being mapped to a physical address in the underlying storage system via an address mapping of the storage system. Specifically, an access request for target data at a virtual address in the storage cell pool is received, and the type of the access request is determined. The access request is served with the cache on the basis of the determined type, where the cache is used to cache data according to a format of a storage cell in the storage cell pool. The cache directly stores data in various storage cells in the pool that is visible to users, so that response speed for the access request may be increased.

22 Claims, 13 Drawing Sheets

METHOD, APPARATUS, AND COMPUTER PROGRAM PRODUCT FOR PROVIDING CACHE SERVICE

CROSS-REFERENCE TO RELATED APPLICATION

This application claims priority to Chinese Patent Application No. CN201811278408.X, on file at the China National Intellectual Property Administration (CNIPA), having a filing date of Oct. 30, 2018, and having "METHOD, APPARATUS, AND COMPUTER PROGRAM PRODUCT FOR PROVIDING CACHE SERVICE" as a title, the contents and teachings of which are herein incorporated by reference in their entirety.

FIELD

Various implementations of the present disclosure generally relate to storage systems, and more specifically, to a method, apparatus and computer program product for providing cache service in a storage system.

BACKGROUND

With the development of data storage techniques, various data storage devices now provide users with increasingly large data storage capacity, and their data access speed has been improved greatly. In storage systems, there has been proposed the concept of storage resource pool. A storage resource pool in a storage system may include a plurality of storage devices, and each among the plurality of storage devices may include a plurality of extents.

At this point, a corresponding storage space in the storage system may be allocated to a user so as to build a user storage system. The user storage system may include a storage cell pool that is visible to the user, and storage cells in the storage cell pool are virtual storage cells which have been mapped by an address mapping in the user storage system to physical addresses in underlying storage systems that provide real storage spaces. In order to provide higher response speed to the user, technical solutions for leveraging caches in the storage system have been developed. Nevertheless, there might exist complex address mapping relationships in the storage system. At this point, it is a research hotspot on how to provide cache service in a storage system more effectively.

SUMMARY

Therefore, it is desirable to develop and implement a technical solution for managing a storage system and providing cache service more effectively. It is desired that the technical solution can be compatible with existing application environments and provide cache service in a storage system more effectively by reconstructing various configurations of these application environments.

According to a first aspect of the present disclosure, there is provided a method for providing cache service in a storage system. Here the storage system includes a storage cell pool, a cache and an underlying storage system, and the storage cell pool includes multiple storage cells, a storage cell among the multiple storage cells being mapped to a physical address in the underlying storage system via an address mapping of the storage system. The method includes: receiving an access request for target data at a virtual address in the storage cell pool; determining the type of the access request, the type including a read request for reading the target data from the storage system and a write request for writing the target data to the storage system; and serving the access request with the cache on the basis of the determined type, wherein the cache is used to cache data in at least one part of storage cells in the storage cell pool according to a format of a storage cell in the storage cell pool.

According to a second aspect of the present disclosure, there is provided an apparatus for providing cache service in a storage system. Here the storage system includes a storage cell pool, a cache and an underlying storage system, and the storage cell pool includes multiple storage cells, a storage cell among the multiple storage cells being mapped to a physical address in the underlying storage system via an address mapping of the storage system. The apparatus includes: at least one processor; a volatile memory; and a memory coupled to the at least one processor, the memory having instructions stored thereon, the instructions, when executed by the at least one processor, causing the apparatus to perform acts. The acts include: receiving an access request for target data at a virtual address in the storage cell pool; determining the type of the access request, the type including a read request for reading the target data from the storage system and a write request for writing the target data to the storage system; and serving the access request with the cache on the basis of the determined type, wherein the cache is used to cache data in at least one part of storage cells in the storage cell pool according to a format of a storage cell in the storage cell pool.

According to a third aspect of the present disclosure, there is provided a computer program product. The computer program product is tangibly stored on a non-transient computer readable medium and includes machine executable instructions which are used to implement a method according to the first aspect of the present disclosure.

BRIEF DESCRIPTION OF THE DRAWINGS

Through the more detailed description in the accompanying drawings, features, advantages and other aspects of the implementations of the present disclosure will become more apparent. Several implementations of the present disclosure are illustrated schematically and are not intended to limit the present disclosure. In the drawings.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The preferred implementations of the present disclosure will be described in more detail with reference to the drawings. Although the drawings illustrate the preferred implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can include other explicit and implicit definitions.

Figure 1:
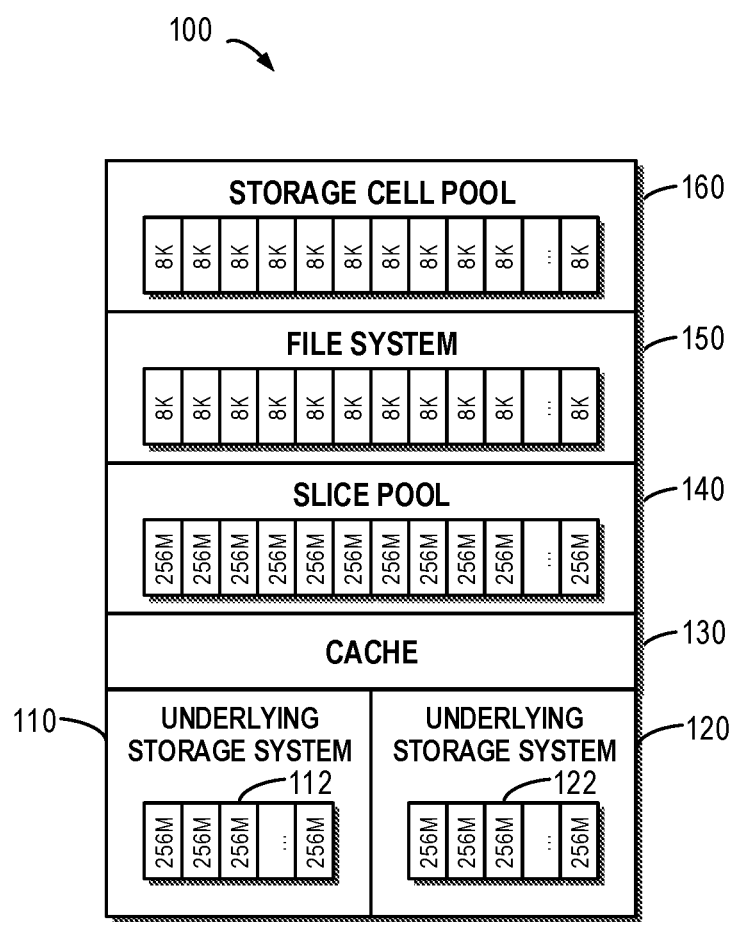
FIG. 1 schematically shows a block diagram of a storage system for providing cache service according to one technical solution.

FIG. 1 schematically shows a block diagram of a storage system 100 for providing cache service according to one technical solution. As depicted, an underlying storage system 110 may be provided. It will be understood the underlying storage system 110 may include multiple data blocks 112. Although the size of a data block is illustrated as 256M in FIG. 1, the data block may further have other size. Further, an underlying storage system 120 may be provided, and the underlying storage system 120 here may include multiple data blocks 122. At this point, the underlying storage system 110 and the underlying storage system 120 may jointly provide storage spaces for users. It will be understood although FIG. 1 shows two underlying storage systems, in other application environment there may exist more or less underlying storage systems that provide storage spaces for users.

It will be understood here the underlying storage system 110 may be any storage system that is currently known or to be developed in future. For example, the underlying storage system 110 may be an ordinary storage system where there is no redundant data. For another example, the underlying storage system 110 may be a storage system with redundant data. At this point, when the underlying storage system 110 fails, the failed portion may be recovered on the basis of redundant data. The underlying storage system 110 may be, for example, a storage system based on Redundant Array of Independent Disks (RAID). Alternatively and/or additionally, the RAID storage system may be a mapped RAID storage system.

A cache 130 may be provided above the underlying storage system 110 and the underlying storage system 120. Here the cache 130 may be used to cache various data blocks in lower layer underlying storage systems. Thereby, when an access request is received from a user of the storage system 100, data no more need to be read from the underlying storage system 110 and the underlying storage system 120, but response speed for the access request may be improved on the basis of cached data in the cache 130.

As shown in FIG. 1, a slice pool 140 may further be provided at an upper layer of the cache 130. For example, a slice may be provided with a 256M size. Above the slice pool 140, slices may be split into smaller-granularity (e.g., 8K) cells. At this point, multiple cells may form a file system 150. Above the file system 150, there is a storage cell pool 160 visible to users. The storage cell pool 160 may include multiple storage cells, and a user may access target data associated with a specified virtual address via an access request. Here, the virtual address may be, for example, an address of a storage cell in the storage cell pool 160.

It will be understood although the cache 130 is provided in the storage system 100 as shown in FIG. 1, the cache 130 resides between the slice pool 140 and the underlying storage system 110/underlying storage system 120. At this point, accessing data in the cache 130 needs to follow the following access path: storage cell pool 160→file system 150→slice pool 140→cache 130. Although the cache 130 accelerates response speed for the access request from the user to some extent to some extent, since the access path includes components at multiple layers and involves complex address mapping relationships, the efficiency of the cache 130 is far from satisfactory.

Figure 2:
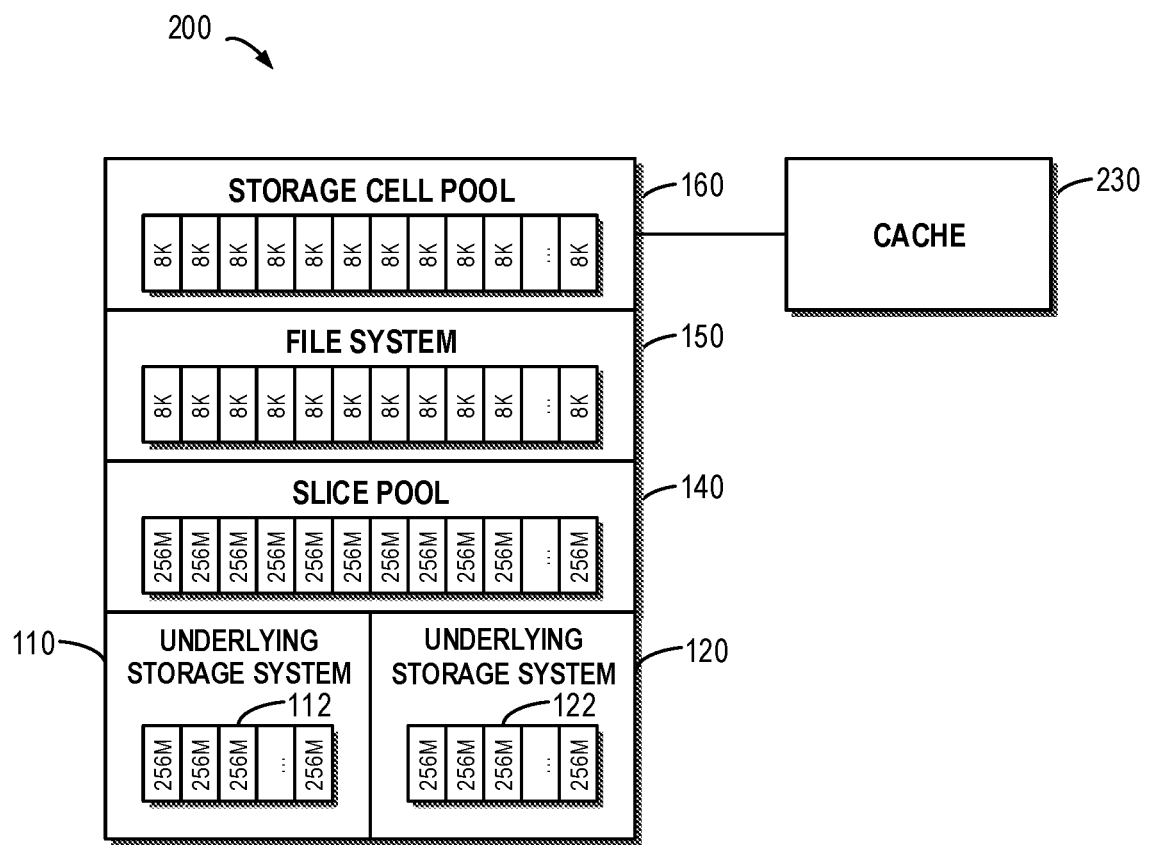
FIG. 2 schematically shows a block diagram of a storage system for providing cache service according to implementations of the present disclosure.

To solve the foregoing drawbacks, implementations of the present disclosure provide a method, apparatus and computer program product for providing cache service in a storage system. With implementations of the present disclosure, cache service may be provided in a storage system more effectively. With reference to FIG. 2, detailed description is presented below to specific implementations of the present disclosure.

Specifically, FIG. 2 schematically shows a block diagram of a storage system 200 for providing cache service according to implementations of the present disclosure. As depicted, the storage system 200 may include a storage cell pool 160 and a cache 230. Unlike the storage system 100 as shown in FIG. 1, the cache 230 is directly coupled to the storage cell pool 160 and can be used to provide cache for one or more storage cells in the storage cell pool 160. Further, the storage system 200 may further include a file system 150, a slice pool 140, an underlying storage system 110 and an underlying storage system 120 as those in FIG. 1. Like the storage system 100 in FIG. 1, the storage cell pool 160 may include multiple storage cells, and a storage cell among the multiple storage cells is mapped via an address mapping (not shown in FIG. 2) to a physical address in the underlying storage system 110 and the underlying storage system 120.

According to example implementations of the present disclosure, the cache 230 in the storage system 200 is directly coupled to the storage cell pool 160, and the cache 230 may cache data in at least one part of storage cells in the storage cell pool 160 in a format of the storage cell in the storage cell pool 160. It will be understood the cache 230 may directly store data in one or more storage cells that are visible to the user. With the foregoing example implementations, when an access request is received from the user, data corresponding to the access request may be looked up in the cache 230 directly on the basis of a virtual address (e.g., represented as an identifier or address of a storage cell) specified in the access request.

In this way, when accessing the cache 230, there is no longer a need to perform complex address conversion under the address mapping of the storage system 200, but data in the cache 230 can be accessed directly or data may be directly written to the cache 230. At this point, an access path for the cache 230 is reduced to: storage cell pool 160→cache 230. As compared with the access path in the storage system 100 as shown in FIG. 1, with the cache 230 in the storage system 200 as shown in FIG. 2, the access path may be greatly shortened, and further response time for the access request from the user may be reduced and response efficiency may be improved.

It will be understood although as shown in FIG. 2 the storage system 200 includes the underlying storage system 110 and the underlying storage system 120, according to example implementations of the present disclosure, the storage system 200 may include only one underlying storage system 110. According to example implementations of the present disclosure, the storage system 200 may include three or more underlying storage systems.

Figure 3:
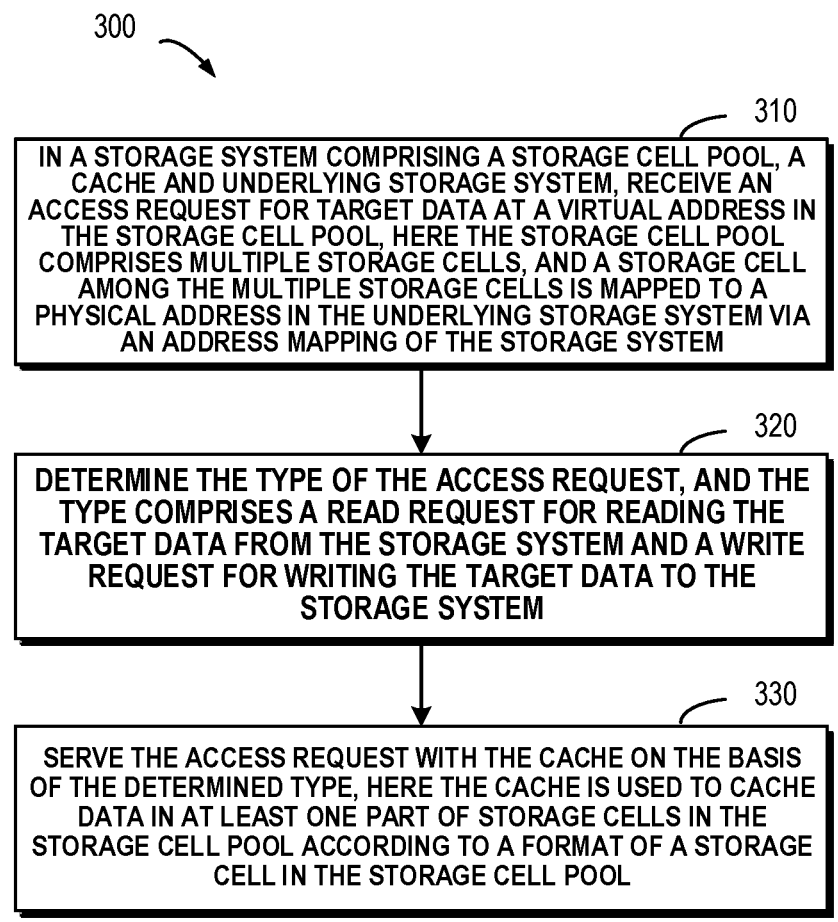
FIG. 3 schematically shows a flowchart of a method for providing cache service in a storage system according to implementations of the present disclosure.

With reference to FIG. 3, detailed description is presented below to more details about a method for providing cache service in a storage system 200. FIG. 3 schematically shows a flowchart of a method 300 for providing cache service in the storage system 200 according to implementations of the present disclosure. It will be understood here the storage system 200 may be a storage system as shown in FIG. 2. The storage system 200 may include a storage cell pool 160, a cache 230 and an underlying storage system 110. For the sake of description, here the storage system 200 includes only one underlying storage system 110. Here the storage cell pool 160 may include multiple storage cells, and each of the multiple storage cells is mapped to a physical address in the underlying storage system 110 via an address mapping of the storage system 200. It will be understood details about the address mapping are not intended to be limited, but the address mapping may be a single-level or multi-level address mapping. Further, the address mapping may be stored using a table structure, a tree structure or other data structure.

At block 310, an access request for target data at a virtual address in the storage cell pool 160 may be received. In different application environments, the access request may have different formats. For example, the virtual address may be represented using an identifier (e.g., 0, 1, 2, etc.) of each storage cell in the storage cell pool 160. For another example, the virtual address may further be represented using an address of each storage cell in the storage cell pool 160. Still for another example, the virtual address may be represented using a start address and an end address (e.g., 0x00 . . . 00 to 0xff . . . ff, etc.) of a storage cell for storing target data in the storage cell pool 160. Still for another example, the virtual address may be represented using a start address and data length (e.g., 0x00 . . . 00 and length) of a storage cell for storing target data in the storage cell pool 160.

According to example implementations of the present disclosure, a storage space in the storage cell pool 160 may be represented using a Logic Unit Number (LUN). Where the storage system 200 includes multiple LUNs, the logical address may further include an identifier of a LUN where the target data are.

At block 320, where an access request is received, the access request may be parsed so as to determine the type of the access request. Here the type of the access request may include a read request for reading the target data from the storage system 200 and a write request for writing the target data to the storage system 200. For example, the type of the access request may be determined by parsing a keyword in the access request. According to example implementations of the present disclosure, the access request may be defined in the following format: 1) Read denotes a read request; Write denotes a write request; 2) the virtual address is represented by a start address and data length of a storage cell where the target data are.

For example, an access request may be received as below: Read (startAdd, length). It is clear by parsing the access request that the access request is a read request, and the virtual address of the target data is an address range with a start address of startAdd and a length of "length." In other words, the access request aims to read from the storage system 200 the target data within an address range having a start address of startAdd and a length of "length."

For another example, an access request may be received as below: Write (startAdd, length, data). It is clear by parsing the access request that the access request is a write request, and the write request aims to write the target data "data" to an address range having a start address of startAdd and a length of length in the storage system 200.

At block 330, the access request is served using the cache 230 on the basis of the determined type. It will be understood here the cache 230 is used to cache data in at least one part of storage cells in the storage cell pool 160 directly according to a format of a storage cell in the storage cell pool 160. It will be understood according to implementations of the present disclosure, the cache 230 directly stores data in the storage cell pool 160 that is visible to the user. At this point, when accessing the cache 230, without a complex address mapping, data in one or more storage cells in the storage cell pool 160 only need to be copied to the cache 230, or data are directly read from the cache 230.

In view of a read request and a write request respectively, detailed description is presented below to how to serve different types of access requests by using the cache 230.

Figure 4:
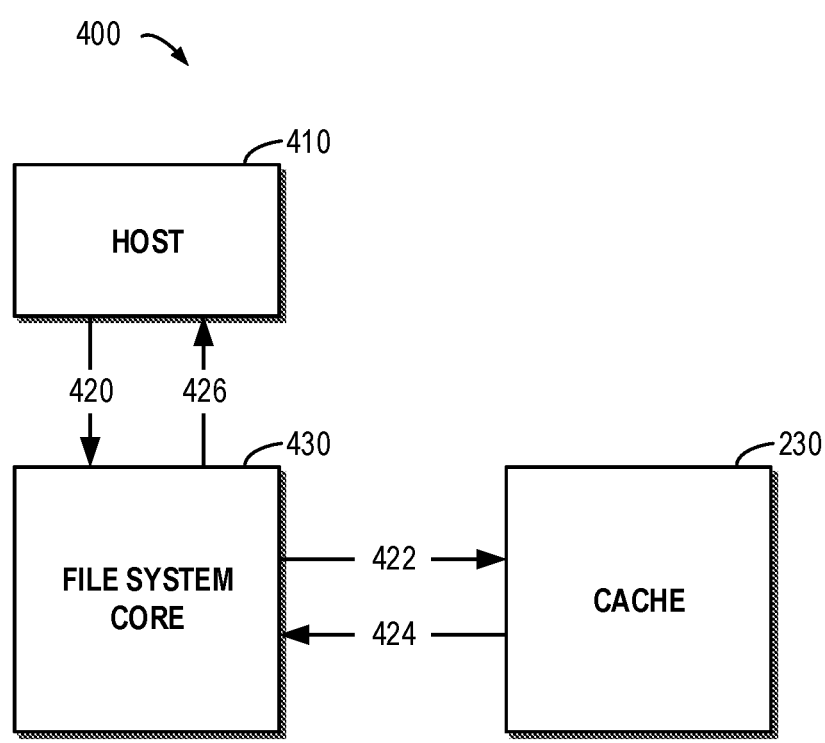
FIG. 4 schematically shows a block diagram of the flow for providing cache service for a read request according to implementations of the present disclosure.

According to example implementations of the present disclosure, the access request may be a read request. First the virtual address of the target data may be obtained from the read request. At this point, there will be two circumstances: cache hit, i.e., the cache 230 contains target data to be accessed by the read request; and cache miss, i.e., the cache 230 does not contain target data to be accessed by the read request. If it is determined desired target data exist in the cache 230, then the target data may be read from the cache 230 directly. Then, the read target data may be returned to the user as a response to the read request. With reference to FIG. 4, description is presented below to more details about the read hit.

FIG. 4 schematically shows a block diagram 400 of the flow for providing cache service for a read request according to implementations of the present disclosure. As depicted, a host 410 may be a device used by the user to access the storage system 200, and a file system core 430 may be processor in the storage system 200 for processing messages to and from the host 410. As shown by an arrow 420, the host 410 may send a read request to the file system core 430. Then as shown by an arrow 430, the file system core 430 may look up in the cache 230 to see whether target data to be accessed by the read request exist in the cache 230 or not. If yes, then the cache is hit. As shown by an arrow 424, the cache 230 may return the found target data to the file system core 430. After receiving the target data obtained from the cache 230, as shown by an arrow 426, the file system core 430 may return to the host 410 the target data to be accessed by the read request.

It will be understood since the to-be-accessed target data are directly stored in the cache 230, the target data may be directly obtained from the cache 230 in case of a cache hit. Compared with the traditional storage system 100 as shown in FIG. 1, there is no need to go through a long access path of "storage cell pool 160→file system 150→slice pool 140→cache 130." On the contrary, with the storage system 200 according to implementations of the present disclosure, the access path is shortened to "storage cell pool 160→cache 230." Since the path the access operation goes along is greatly shortened, the access request from the user may be responded to at higher speed.

Figure 5:
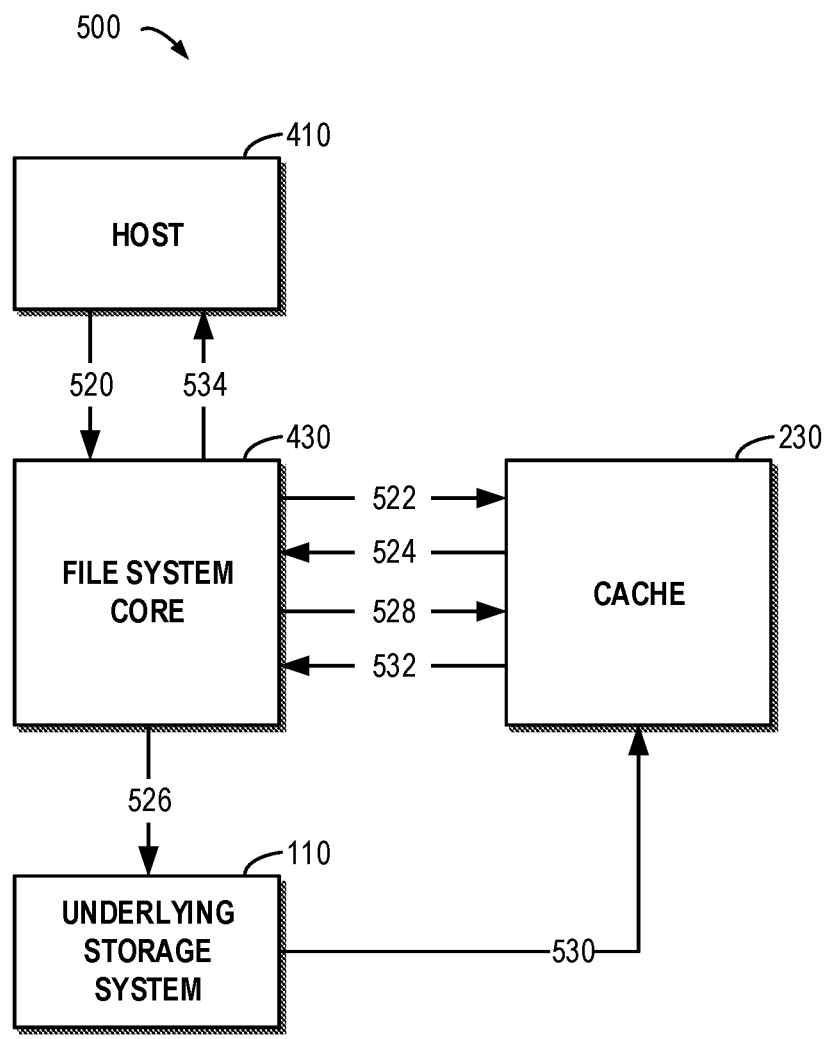
FIG. 5 schematically shows a block diagram of operations for providing cache service for a read request according to implementations of the present disclosure.

According to example implementations of the present disclosure, there may also arise a circumstance in which the target data do not exist in the cache 230. At this point, a physical address of the target data in the underlying storage system 110 may be determined on the basis of the address mapping, and the target data are read from the physical address in the underlying storage system 110. Next, the target data read from the underlying storage system 110 may be loaded to the cache 230, and the read target data may be returned as a response to the read request. It will be understood although the target data still need to be read from the physical address of the target data via the address mapping and returned to the user, by loading the read target data to the cache 230, when an access request for the target data or one part of the target data is received in future, the to-be-accessed data may be directly found in the cache. With reference to FIG. 5, description is presented below to more details about a read miss.

FIG. 5 schematically shows a block diagram 500 of operations for providing cache service for a read request according to implementations of the present disclosure. In the figure, as shown by an arrow 510, the host 410 may send a read request to the file system core 430. Then as shown by an arrow 522, the file system core 430 may look up in the cache 230 to see whether target data to be accessed by the read request exist in the cache 230 or not. If not, then the cache is missed. As shown by an arrow 524, the cache 230 may return to the file system core 430 a message indicating the target data are not found in the cache 230. At this point, the file system core 430 may determine a physical address of the target data in the underlying storage system 110 on the basis of the address mapping.

Next as shown by an arrow 526, the file system core 430 may retrieve the target data in the underlying storage system 110. As shown by an arrow 530, the target data retrieved from the underlying storage system 110 may be loaded to the cache 230. As shown by an arrow 532, the target data may be sent to the file system core 430. Finally, as shown by an arrow 534, the target data may be sent to the host 410.

It will be understood in the example implementation shown in FIG. 5, the target data may be loaded to the cache 230. Later, if an access request for the target data is received at the host 410 again, then the target data may be directly obtained from the cache 230, without the complex address mapping as the traditional technical solution shown in FIG. 1. With the above example implementation, the data access speed may be accelerated significantly and further the user experience may be improved.

It will be understood if the host 410 continuously receives access requests for a contiguous address range or virtual addresses of access requests which are received in a succession meet other condition, then at this point it may be judged whether a next access request satisfying the access condition will be received at a next time point or not. Suppose the judgment result is "yes," then candidate data which the next access request might access may be loaded in advance to the cache 230 before the next access request is received. The operation may be referred to a "prefetching" operation. At this point, a candidate address of the candidate data in the storage cell pool 160 may be predicted. Next, a physical address of the candidate address in the underlying storage system may be determined on the basis of the address mapping, and the candidate data may be read from the physical address in the underlying storage system 110 so as to load the read candidate data to the cache 230.

Description is presented below in the context of access requests for a contiguous address range. According to example implementations of the present disclosure, suppose the host 410 receives access requests for data in a first and a second storage cell in the storage cell pool 160, then at this point it may be predicted at a next time point the host 410 will receive an access request for data in a third storage cell in the storage cell pool 160. At this point, a prefetching operation may be performed before an access request for data in the third storage cell is received. In other words, data in the third storage cell may be loaded in advance from the underlying storage system 110 to the cache 230. According to example implementations of the present disclosure, detailed description is presented below to more details about the prefetching operation with reference to FIG. 6.

Figure 6:
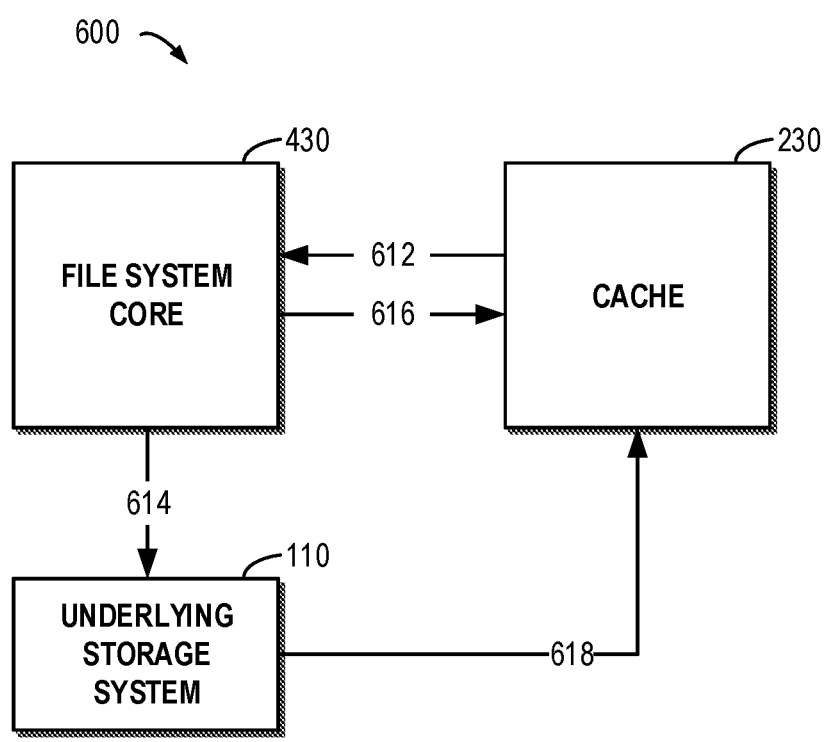
FIG. 6 schematically shows a block diagram of operations for providing prefetching cache service for a read request according to implementations of the present disclosure.

FIG. 6 schematically shows a block diagram 600 of operations for providing prefetching cache service for a read request according to implementations of the present disclosure. In the figure, the host 410 continuously receives access requests for contiguous storage cells, and then a prefetching operation may be started. As shown by an arrow 612, the cache 230 may send a request for obtaining the address mapping to the file system core 430. In response to receiving the request, as shown by an arrow 614, the file system core 430 may obtain the address mapping, and as shown by an arrow 616, the file system core 430 may return the address mapping to the cache 230. Next as shown by an arrow 618, the cache 230 may obtain candidate data from the underlying storage system 110 by using the obtained address mapping and load the obtained candidate data to the cache 230.

With the above example implementations, candidate data that are highly likely to be accessed in future are loaded in advance to the cache 230 from the underlying storage system, and when an access request for the candidate data is received subsequently, desired data may be found from the cache 230 immediately. In this way, the speed for processing user requests may be greatly accelerated and further the user experience may be improved. After loading, even if no access request for the candidate data is received at the host 410 within a limited time, the candidate data in the cache 230 may serve subsequent access requests before being removed from the cache 230. With the above example implementations, the data access speed may be greatly accelerated, and the user experience may be improved.

Figure 7:
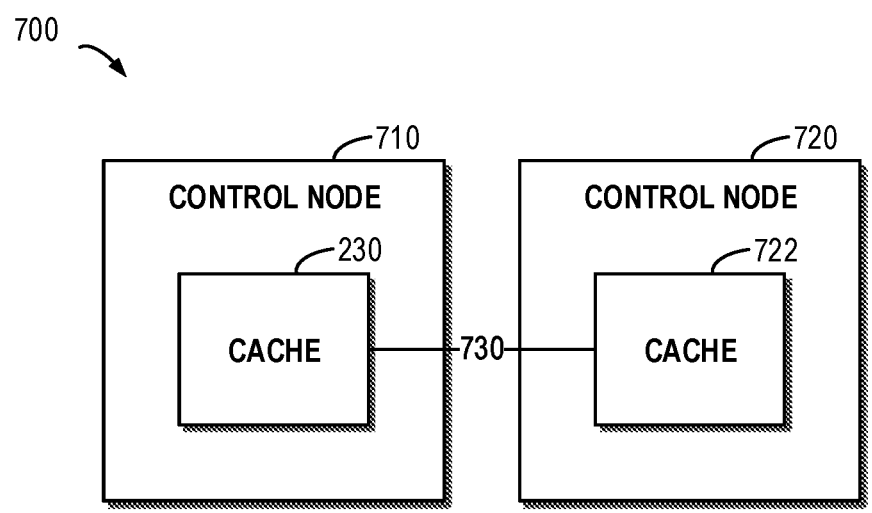
FIG. 7 schematically shows a block diagram of a control node of a storage system in which the method of the present disclosure may be applied according to implementations of the present disclosure.

It will be understood in order to further increase the processing efficiency of the storage system 200 for user access requests, the storage system 200 may include multiple control nodes so as to provide data service to multiple users in parallel. FIG. 7 schematically shows a block diagram 700 of a control node of a storage system 200 in which the method of the present disclosure may be applied according to implementations of the present disclosure. As depicted, the storage system 200 may include two control nodes, 710 and 720. Specifically, the control nodes 710 and 720 may have respective caches 230 so as to cache data in at least one part of storage cells in the storage cell pool 160. Similarly, the control 720 may include a similar structure. A cache 722 as shown in FIG. 7 may also be used to cache data in at least one part of storage cells in the storage cell pool 160. As shown in FIG. 7, a data channel 730 is used to synchronize data between the two caches 230 and 722.

According to example implementations of the present disclosure, after a write request is received, first to-be-written target data may be loaded to the cache 230. When a predetermined time interval or a predetermined amount of to-be-written data in the cache 230 is reached, the to-be-written data may be flushed to the underlying storage system 110. As shown in FIG. 7, where the storage system 200 includes two control nodes 710 and 720, after the target data are written to the cache 230, first a state of the target data in the cache 230 is set to "dirty" so as to indicate the target data in the cache 230 are not yet flushed to the underlying storage system 110.

Figure 8:
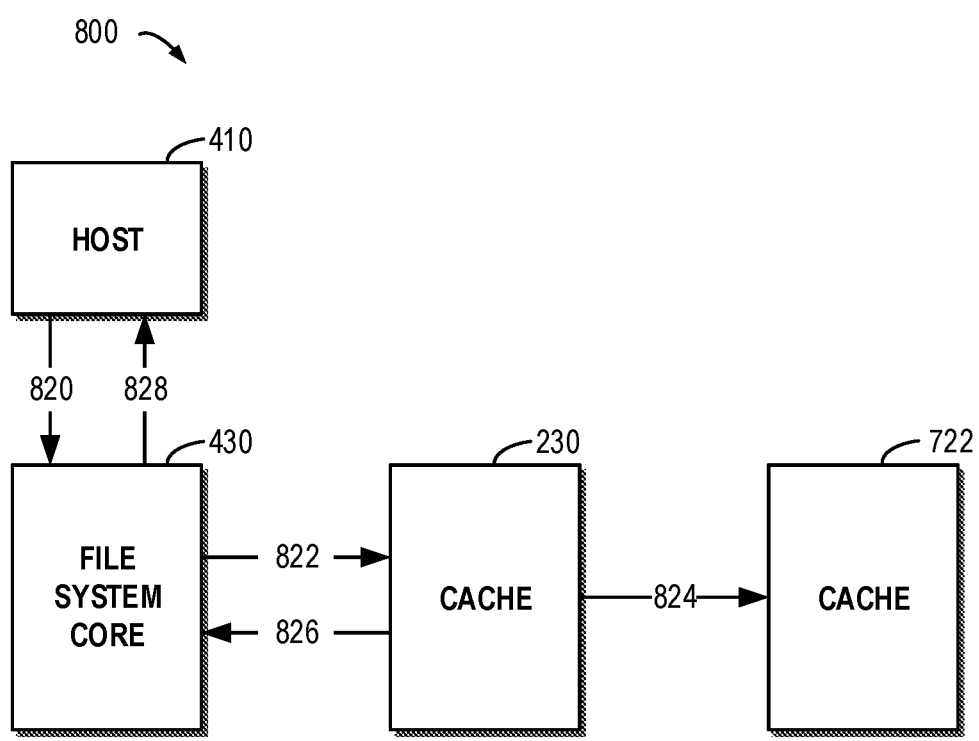
FIG. 8 schematically shows a block diagram of operations for providing cache service for a write request according to implementations of the present disclosure.

With reference to FIG. 8, description is presented to more details about a write operation. FIG. 8 schematically shows a block diagram 800 of operations for providing cache service for a write request according to implementations of the present disclosure. As shown by an arrow 820, the host 410 may send a write request to the file system core 430 so as to indicate target data at a virtual address in the storage cell pool 160 are to be written to the storage system 200. As shown by an arrow 820, the file system core 430 first writes the target data to the cache 230. Then as shown by an arrow 824, the cache 230 synchronizes the written target data with the peer cache 722. Subsequently, the cache 230 informs the file system core 430 of completion of the write process.

It will be understood since the target data are merely written to the cache 230 and the cache 722 but not really flushed to the underlying storage system 110, at this point the target data in the caches 230 and 722 are marked as "dirty" so as to indicate the target data are not yet flushed to the underlying storage system 110. More details about a flush operation will be described below.

According to example implementations of the present disclosure, a physical address in the underlying storage system 110 which corresponds to the virtual address of the target data in the storage cell pool 160 may be determined on the basis of the address mapping and the virtual address. Subsequently, the target data may be written to the physical address in the underlying storage system 110. According to example implementations of the present disclosure, after the target data in the cache are flushed to the physical address in the underlying storage system 110, the state of the target data may be set to "clean" so as to indicate the target data in the cache 230 have been flushed to the underlying storage system 110. More details about a flush operation will be described with reference to FIG. 9 below.

Figure 9:
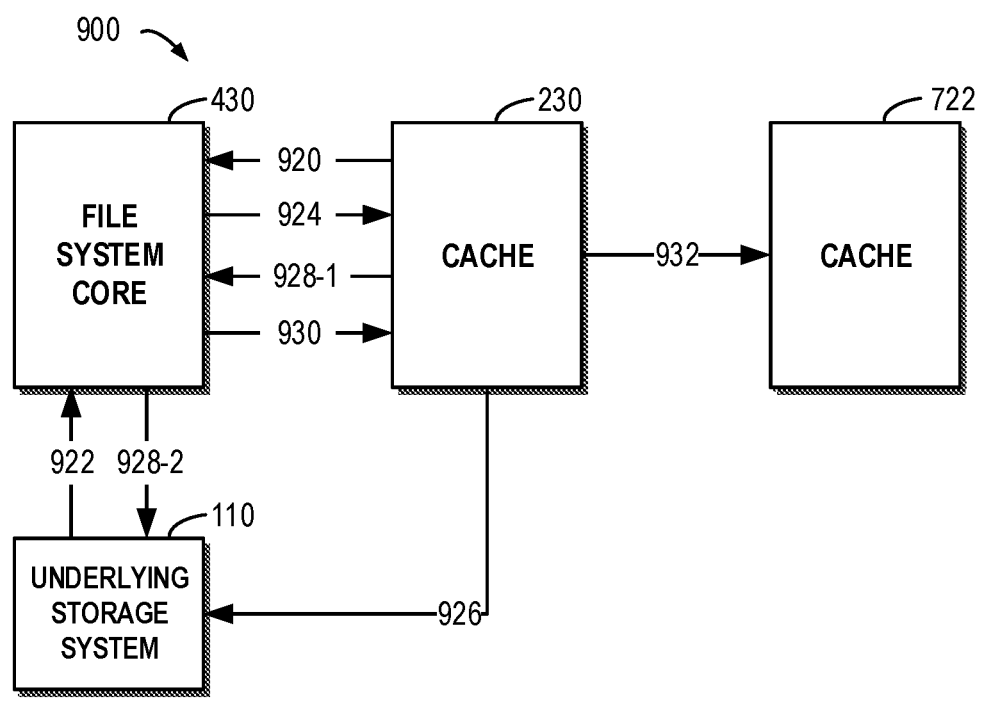
FIG. 9 schematically shows a block diagram of operations for providing cache service for a write request according to implementations of the present disclosure.

FIG. 9 schematically shows a block diagram 900 of operations for providing cache service for a write request according to implementations of the present disclosure. As depicted, as shown by an arrow 920, in order to perform a flush operation, the cache 230 may first send to the file system core 430 a request for obtaining the address mapping. Then as shown by an arrow 924, the file system core 430 sends the address mapping to the cache 230. As shown by an arrow 926, the cache 230 may write target data from the cache 230 to a physical address of the target data in the storage cell pool 160 which corresponds to the virtual address, on the basis of the obtained address mapping.

Subsequently, as shown by arrows 928-1 and 928-2, the cache 230 may use the file system core 430 to inform the underlying storage system 110 of the performance of the write operation. As shown by an arrow 930, the file system core 430 may notify the cache 230 of completion of the write operation. Then as shown by an arrow 932, the cache 230 may notify the cache 722 so that a corresponding operation may be performed at the peer cache 722. After completion of the write operation, the state of the target data in the cache 230 may be set to "clean" from "dirty."

At the peer cache 722, after a notification is received from the cache 230 as shown by the arrow 932, the state of the synchronized target data in the cache 722 may be set to "clean." At this point, data in both the caches 230 and 722 are latest data and consistent with data stored in the underlying storage system 110.

More details about the underlying storage systems 110 and 120 will be described in detail with reference to FIGS. 10A to 12. In the context of the present disclosure, both the underlying storage system 110 and 120 may be RAID-based storage systems. The RAID-based storage system may combine multiple storage devices into an array of disks. By providing redundant storage devices, reliability of an entire disk group is caused to significantly exceed a single storage device. RAID may offer various advantages over a single storage device, for example, enhancing data integrity, enhancing fault tolerance, increasing throughput or capacity, etc. There exist a number of RAID standards, such as RAID-1, RAID-2, RAID-3, RAID-4, RAID-5, RAID-6, RAID-10, RAID-50, etc. For more details about RAID levels, those skilled in the art may refer to https://en.wikipedia.org/wiki/Standard_RAID_levels and https://en.wikipedia.org/wiki/Nested_RAID_levels, etc.

Figure 10A:
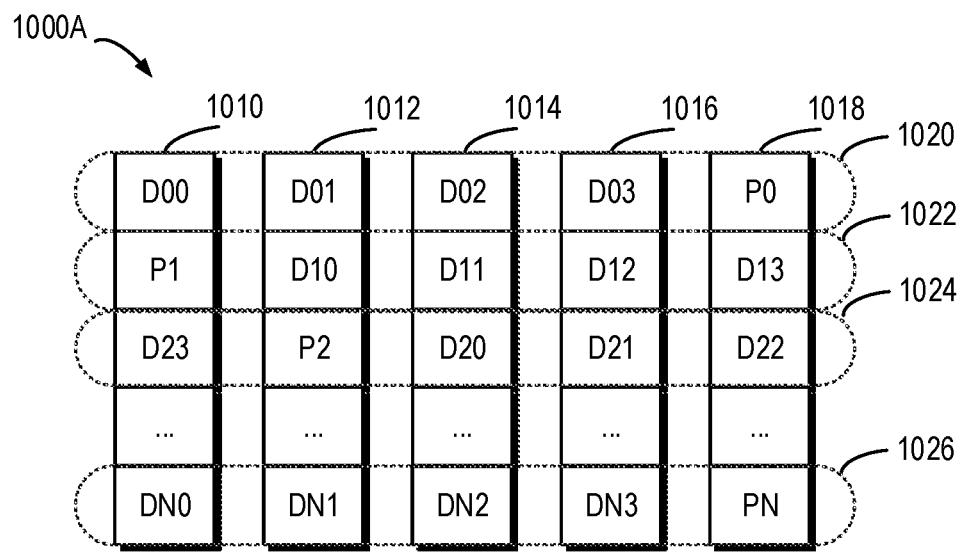
FIGS. 10A and 10B each schematically shows a view of a storage system in which the method of the present disclosure may be implemented according to implementations of the present disclosure.

FIG. 10A schematically illustrates a schematic view of a storage system 1000A according to implementations of the present disclosure. In the storage system shown in FIG. 10A, working principles of RAID are illustrated by taking a RAID-5 (4D+1P, where 4D represents that 4 storage devices are included in the storage system for storing data, and 1P represents that 1 storage device is included in the storage system for storing parity) array that consists of five independent storage devices (1010, 1012, 1014, 1016 and 1018) as an example. It should be noted although five storage devices are schematically shown in FIG. 10A, in other implementations more or less storage devices may be comprised according to different levels of RAID. Although FIG. 10A illustrates stripes 1020, 1022, 1024, . . . , 1026, in other examples the RAID system may further include a different number of stripes.

In RAID, a stripe crosses multiple physical storage devices (for example, the stripe 1020 crosses storage the devices 1010, 1012, 1014, 1016 and 1018). The stripe may be simply construed as a storage area among multiple storage devices which satisfies a given address range. Data stored in the stripe 1020 includes multiple parts: a data block D00 stored in the storage device 1010, a data block D01 stored in the storage device 1012, a data block D02 stored in the storage device 1014, a data block D03 stored in the storage device 1016, and a data block P0 stored in the storage device 1018. In this example, the data blocks D00, D01, D02 and D03 are stored data, and the data block P0 is a P parity of the stored data.

The mode of storing data in other stripes 1022 and 1024 is similar to that in the stripe 1020, and the difference is that the parity about other data block may be stored in other storage device than the storage device 1018. In this way, when one of the multiple storage devices 1010, 1012, 1014, 1016 and 1018 fails, data in the failed device may be recovered from other normal storage devices.

Figure 10B:
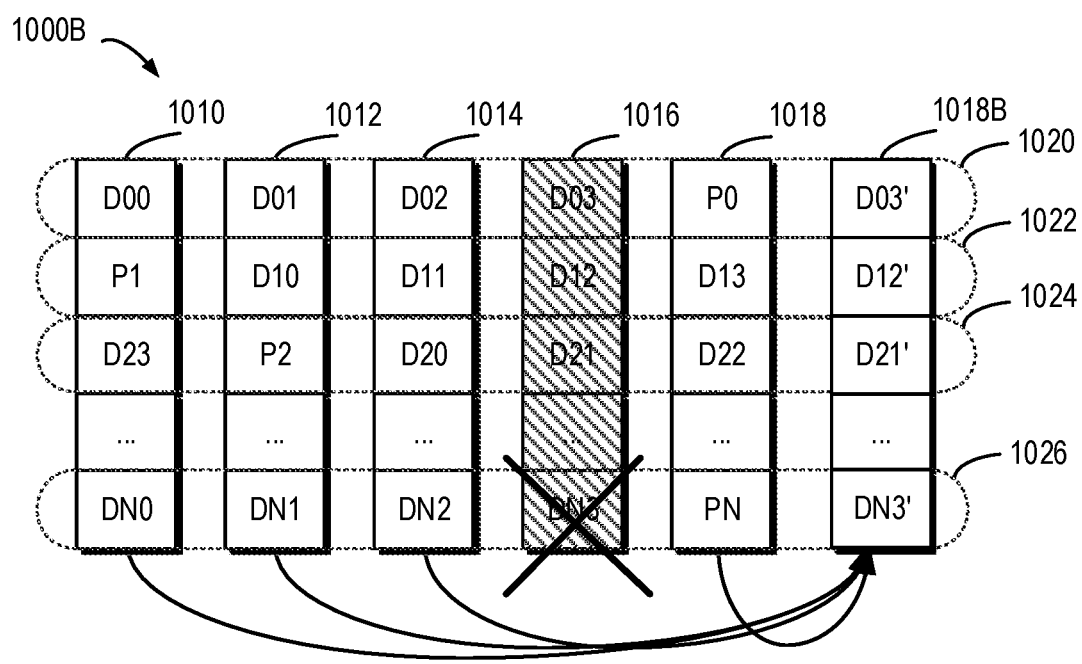

FIG. 10B schematically illustrates a schematic view 1000B of rebuilding process of a storage system 1000A according to implementations of the present disclosure. As shown in FIG. 10B, when one storage device (e.g. the shaded storage device 1016) fails, data may be recovered from the other storage devices 1010, 1012, 1014 and 1018 that operate normally. At this point, a new backup storage device 1018B may be added to RAID to replace the storage device 1018. In this way, recovered data may be written to 1018B, and system rebuilding may be realized.

Note while a RAID-5 storage system including 5 storage devices (among which 4 storage devices are used for storing data and 1 storage device is used for storing parity) has been described with reference to FIGS. 10A and 10B, according to definition of other RAID levels, there may further exist a storage system including a different number of storage devices. On the basis of definition of RAID-6, for example, two storage devices may be used to store parity P and Q respectively. For another example, according to definition of triple-parity RAID, three storage devices may be used to store parity P, Q and R respectively.

Figure 11:
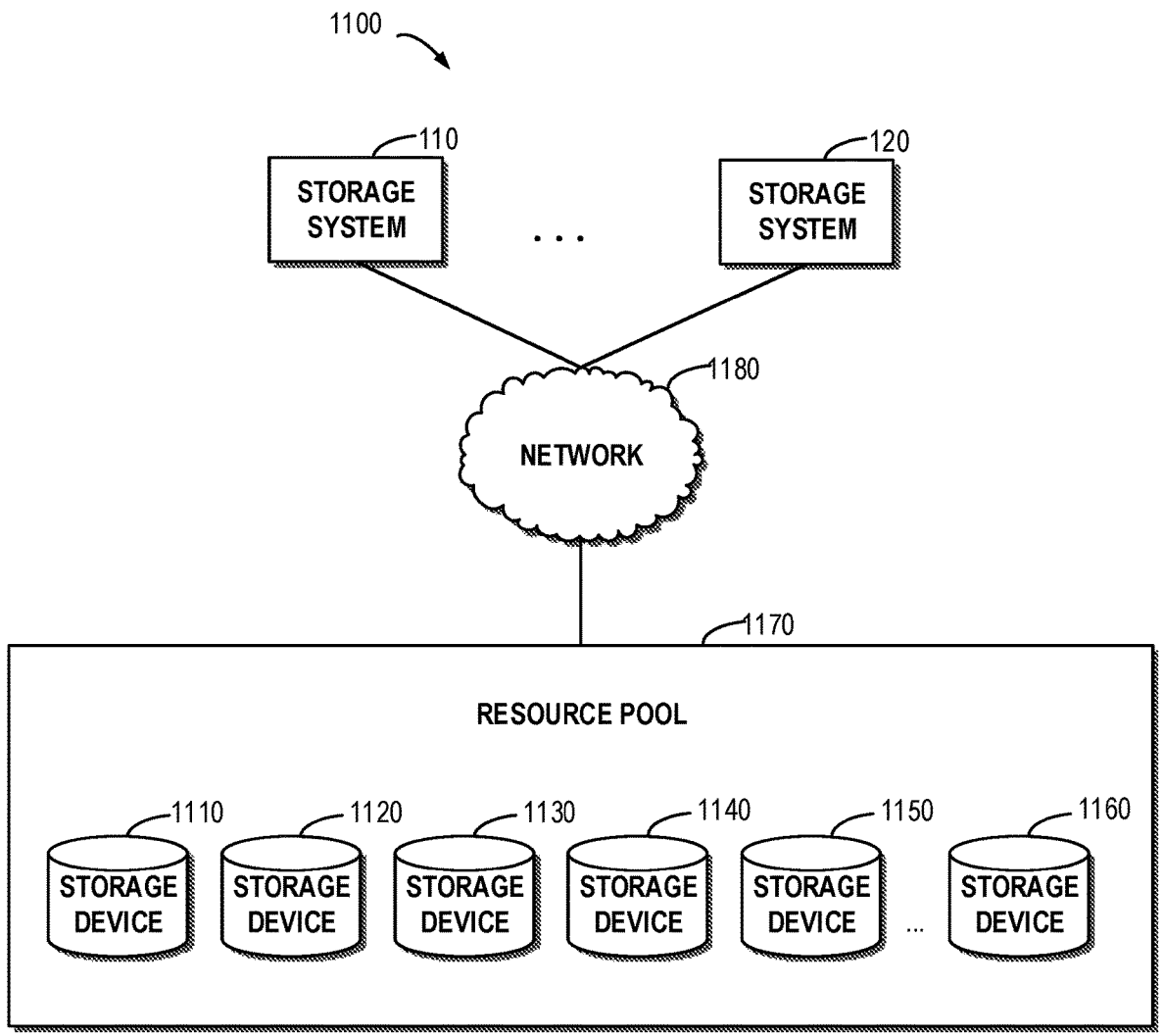
FIG. 11 schematically shows a block diagram of an example environment in which the method of the present disclosure may be implemented according to implementations of the present disclosure.

With the development of distributed storage technologies, the various storage devices 1010, 1012, 1014, 1016 and 1018 in the storage system shown in FIGS. 10A and 10B may be no longer limited to physical storage devices but may be virtual storage devices. For example, respective extents on the storage device 1010 may come from different physical storage devices (hereinafter referred to as storage devices for short) in the resource pool. FIG. 11 schematically shows a block diagram of an example environment in which the method of the present disclosure may be implemented. As depicted, a storage resource pool 1170 may include multiple physical storage devices 1110, 1120, 1130, 1140, 1150, . . . , 1160. At this point, storage spaces in these storage devices may be allocated to multiple storage systems 110, . . . , 120. The storage systems 110, . . . , 120 may access storage spaces in various storage devices in the storage resource pool via a network 1180.

Figure 12:
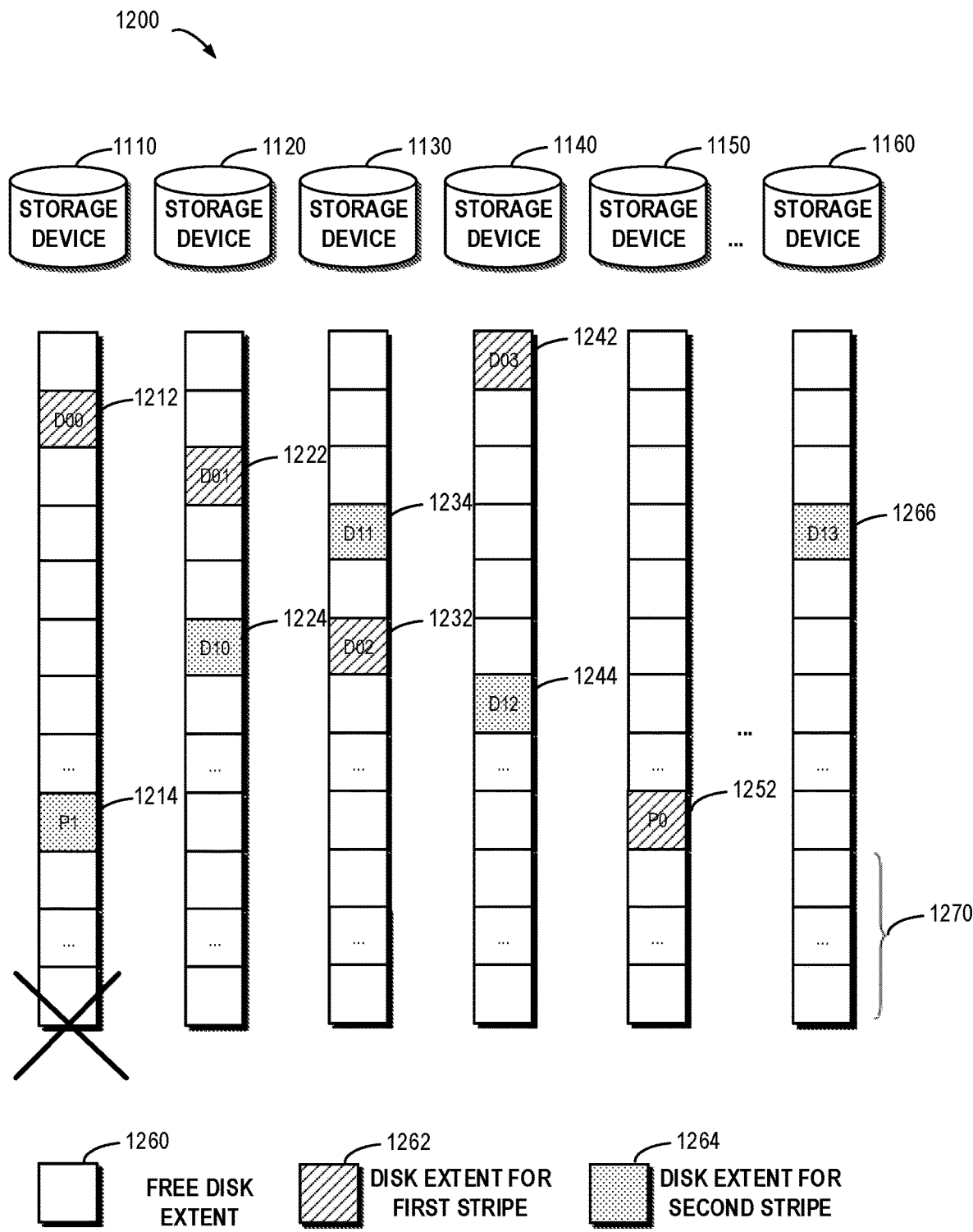
FIG. 12 schematically shows a diagram of a storage cell pool in FIG. 11.

FIG. 12 schematically shows a diagram of more information of the storage resource pool 1170 as shown in FIG. 11. The storage resource pool 1170 may include multiple storage devices 1110, 1120, 1130, 1140, 1150, . . . , 1160. Each storage device may include multiple extents, wherein a blank extent (as shown by a legend 1260) represents a free extent, an extent (as shown by a legend 1262) shown with slashes represents an extent for a first stripe of the storage system 1000A in FIG. 10A, and a shaded extent (as shown by a legend 1264) represents an extent for a second stripe of the storage system 1000A in FIG. 10A. At this point, extents 1212, 1222, 1232, 1242 and 1252 for the first stripe are for storing data blocks D00, D01, D02, D03 and parity P0 of the first stripe respectively. Extents 1224, 1234, 1244, 1254 and 1214 for the second stripe are for storing blocks D10, D11, D12, D13 and parity P1 of the second stripe respectively.

As shown in FIG. 12, there may exist a reserved free portion 1270 in each storage device, so that when a storage device in the resource pool fails, extents in the free portion 1270 in each storage device may be selected to rebuild various extents in the failed storage device.

Note in FIG. 12 the 4D+1P RAID-5 storage system is taken as an example to illustrate how extents in various stripes are distributed over multiple storage systems in the resource pool. When RAID based on other level is used, those skilled in the art may implement concrete details on the basis of the above described principles. For example, in the 6D+1P+1Q RAID-6 storage system, 8 extents in each stripe may be distributed over multiple storage devices so as to ensure a load balance between the multiple storage devices.

While examples of the method according to the present disclosure have been described in detail with reference to FIGS. 2 to 12, description is presented below to the implementation of a corresponding apparatus. According to example implementations of the present disclosure, provided is an apparatus for providing cache service in a storage system. The storage system includes a storage cell pool, a cache and an underlying storage system, the storage cell pool including multiple storage cells, a storage cell among the multiple storage cells being mapped to a physical address in the underlying storage system via an address mapping of the storage system. The apparatus includes: a receiving module configured to receive an access request for target data at a virtual address in the storage cell pool; a determining module configured to determine the type of the access request, the type including a read request for reading the target data from the storage system and a write request for writing the target data to the storage system; and a serving module configured to serve the access request with the cache on the basis of the determined type, wherein the cache is used to cache data in at least one part of storage cells in the storage cell pool according to a format of a storage cell in the storage cell pool.

Figure 13:
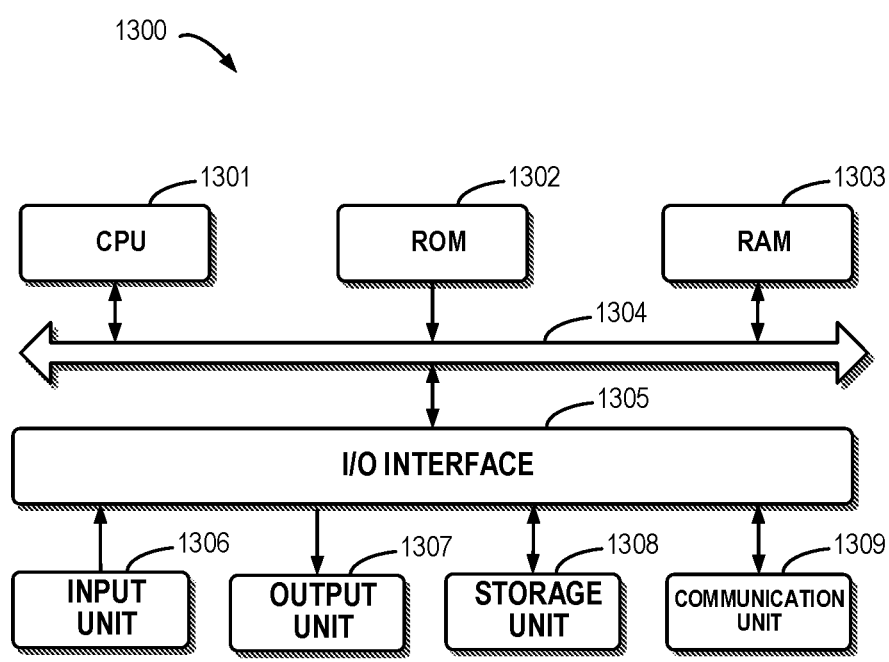
FIG. 13 schematically shows a block diagram of an apparatus for providing cache service according to example implementations of the present disclosure.

FIG. 13 schematically shows a block diagram of an apparatus 1300 for managing a storage system according to example implementations of the present disclosure. As depicted, the apparatus 1300 includes a central process unit (CPU) 1301, which can execute various suitable actions and processing based on the computer program instructions stored in the read-only memory (ROM) 1302 or computer program instructions loaded in the random-access memory (RAM) 1303 from a storage unit 1308. The RAM 1303 can also store all kinds of programs and data required by the operations of the apparatus 1300. CPU 1301, ROM 1302 and RAM 1303 are connected to each other via a bus 1304. The input/output (I/O) interface 1305 is also connected to the bus 1304.

A plurality of components in the apparatus 1300 is connected to the I/O interface 1305, including: an input unit 1306, such as keyboard, mouse and the like; an output unit 1307, e.g., various kinds of display and loudspeakers etc.; a storage unit 1308, such as magnetic disk and optical disk etc.; and a communication unit 1309, such as network card, modem, wireless transceiver and the like. The communication unit 1309 allows the apparatus 1300 to exchange information/data with other devices via the computer network, such as Internet, and/or various telecommunication networks.

The above described each process and treatment, such as the method 300, can also be executed by the processing unit 1301. For example, in some implementations, the method 300 can be implemented as a computer software program tangibly included in the machine-readable medium, e.g., the storage unit 1308. In some implementations, the computer program can be partially or fully loaded and/or mounted to the apparatus 1300 via ROM 1302 and/or the communication unit 1309. When the computer program is loaded to the RAM 1303 and executed by the CPU 1301, one or more steps of the above described method 300 can be implemented. Alternatively, in other implementations, the CPU 1301 also can be configured in other suitable manners to realize the above procedure/method.

According to example implementations of the present disclosure, there is provided an apparatus for providing cache service in a storage system. The storage system includes a storage cell pool, a cache and an underlying storage system, the storage cell pool including multiple storage cells, a storage cell among the multiple storage cells being mapped to a physical address in the underlying storage system via an address mapping of the storage system. The apparatus includes: at least one processor; a volatile memory; and a memory coupled to the at least one processor, the memory having instructions stored thereon, the instructions, when executed by the at least one processor, causing the apparatus to perform acts.

The acts include: receiving an access request for target data at a virtual address in the storage cell pool; determining the type of the access request, the type including a read request for reading the target data from the storage system and a write request for writing the target data to the storage system; and serving the access request with the cache on the basis of the determined type, wherein the cache is used to cache data in at least one part of storage cells in the storage cell pool according to a format of a storage cell in the storage cell pool.

According to example implementations of the present disclosure, serving the access request with the cache includes: in response to determining the access request is a read request, obtaining the virtual address from the read request; determining whether data corresponding to the virtual address exist in the cache or not; in response to determining the data exist in the cache, reading the data from the cache; and returning the read data so as to respond to the read request.

According to example implementations of the present disclosure, the acts further include: in response to determining the data do not exist in the cache, determining a physical address of the target data in the underlying storage system on the basis of the address mapping; reading the target data from the physical address in the underlying storage system so as to load the read target data to the cache; and returning the read target data so as to respond to the read request.

According to example implementations of the present disclosure, the acts further include: determining candidate data to be read by a next read request on the basis of the access request; and loading the candidate data to the cache from the underlying storage system.

According to example implementations of the present disclosure, loading the candidate data to the cache from the underlying storage system includes: obtaining a candidate address of the candidate data in the storage cell pool; determining a physical address in the underlying storage system which corresponds to the candidate address on the basis of the address mapping; and reading the candidate data from the physical address of the underlying storage system so as to load the read candidate data to the cache.

According to example implementations of the present disclosure, serving the access request with the cache includes: in response to determining the access request is a write request, writing the target data to the cache; and setting a state of the target data in the cache to "dirty" so as to indicate the target data in the cache are not yet flushed to the underlying storage system.

According to example implementations of the present disclosure, the acts further include: determining a physical address in the underlying storage system which corresponds to the virtual address on the basis of the address mapping; and writing the target data to the physical address in the underlying storage system.

According to example implementations of the present disclosure, writing the target data to the physical address in the underlying storage system includes: flushing the target data in the cache to the physical address in the underlying storage system; and setting the state to "clean" so as to indicate the target data in the cache have been flushed to the underlying storage system.

According to example implementations of the present disclosure, the storage system further includes a peer cache, the peer cache being used to cache data in at least one part of storage cells in the storage cell pool according to a format of a storage cell in the storage cell pool.

According to example implementations of the present disclosure, the acts further include: synchronizing the target data with the peer cache; and setting a peer state of the synchronized target data in the peer cache to "dirty" so as to indicate the synchronized target data in the peer cache are not yet flushed to the underlying storage system.

According to example implementations of the present disclosure, the acts further include: setting the peer state to "clean" in response to the target data in the cache having been flushed to the underlying storage system.

According to example implementations of the present disclosure, there is provided a computer program product. The computer program product is tangibly stored on a non-transient computer readable medium and includes machine executable instructions which are used to implement the method according to the present disclosure.

According to example implementations of the present disclosure, there is provided a computer readable medium. The computer readable medium has machine executable instructions stored thereon, the machine executable instructions, when executed by at least one processor, causing the at least one processor to implement the method according to the present disclosure.

The present disclosure can be method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to implementations of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only by way of example rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable other ordinary skilled in the art to understand implementations of the present disclosure.

We claim:

1. A method for providing cache service in a storage system, the storage system comprising a storage cell pool, a cache and an underlying storage system, the storage cell pool comprising multiple storage cells, a storage cell among the multiple storage cells being mapped to a physical address in the underlying storage system via an address mapping of the storage system, the method comprising:
   receiving an access request for target data at a virtual address in the storage cell pool;
   determining the type of the access request, the type comprising a read request for reading the target data from the storage system and a write request for writing the target data to the storage system; and
   serving the access request with the cache on the basis of the determined type, wherein the cache is used to cache data in at least one part of storage cells in the storage cell pool according to a format of a storage cell in the storage cell pool;
   wherein the storage system further comprises a peer cache, the peer cache being used to cache data in at least one part of storage cells in the storage cell pool according to a format of a storage cell in the storage cell pool, the method further comprising:
   synchronizing the target data with the peer cache; and
   setting a peer state of the synchronized target data in the peer cache to "dirty" so as to indicate the synchronized target data in the peer cache are not yet flushed to the underlying storage system.

2. The method of claim 1, further comprising:
   serving a second access request with the cache including:
      in response to determining the second access request is a read request,
         obtaining a second virtual address from the read request;
         determining whether data corresponding to the second virtual address exist in the cache or not;
         in response to determining the data exist in the cache, reading the data from the cache; and
         returning the read data so as to respond to the read request.

3. The method of claim 1, further comprising:
   serving a second access request with the cache including:
      in response to determining the second access request is a read request,
   obtaining a second virtual address from the read request:
   determining whether data corresponding to the second virtual address exist in the cache or not:
   in response to determining the data do not exist in the cache,
   determining a physical address of the target data in the underlying storage system on the basis of the address mapping;
   reading the target data from the physical address in the underlying storage system so as to load the read target data to the cache; and returning the read target data so as to respond to the read request.

4. The method of claim 1, further comprising:
   determining candidate data to be read by a next read request on the basis of a second access request; and
   loading the candidate data to the cache from the underlying storage system.

5. The method of claim 4, wherein loading the candidate data to the cache from the underlying storage system comprises:
   obtaining a candidate address of the candidate data in the storage cell pool;
   determining a physical address in the underlying storage system which corresponds to the candidate address on the basis of the address mapping; and
   reading the candidate data from the physical address of the underlying storage system so as to load the read candidate data to the cache.

6. The method of claim 1, wherein serving the access request with the cache comprises: in response to determining the access request is a write request,
   writing the target data to the cache; and
   setting a state of the target data in the cache to "dirty" so as to indicate the target data in the cache are not yet flushed to the underlying storage system.

7. The method of claim 6, further comprising:
   determining a physical address in the underlying storage system which corresponds to the virtual address on the basis of the address mapping; and
   writing the target data to the physical address in the underlying storage system.

8. The method of claim 7, wherein writing the target data to the physical address in the underlying storage system comprises:
   flushing the target data in the cache to the physical address in the underlying storage system; and
   setting the state to "clean" so as to indicate the target data in the cache have been flushed to the underlying storage system.

9. The method of claim 1, further comprising:
   setting the peer state to "clean" in response to the target data in the cache having been flushed to the underlying storage system.

10. The method of claim 1, wherein the format of the storage cell in the storage pool is based on a predefined addressing scheme; and wherein the method further comprises:
    parsing the access request in accordance with the predefined addressing scheme to obtain the virtual address.

11. An apparatus for providing cache service in a storage system, the storage system comprising a storage cell pool, a cache and an underlying storage system, the storage cell pool comprising multiple storage cells, a storage cell among the multiple storage cells being mapped to a physical address in the underlying storage system via an address mapping of the storage system, the apparatus comprising:
    at least one processor;
    a volatile memory; and
    a memory coupled to the at least one processor and having instructions stored thereon, the instructions, when executed by the at least one processor, causing the apparatus to perform acts comprising:
       receiving an access request for target data at a virtual address in the storage cell pool;
       determining the type of the access request, the type comprising a read request for reading the target data from the storage system and a write request for writing the target data to the storage system; and
       serving the access request with the cache on the basis of the determined type, wherein the cache is used to cache data in at least one part of storage cells in the storage cell pool according to a format of a storage cell in the storage cell pool;
    wherein the storage system further comprises a peer cache, the peer cache being used to cache data in at least one part of storage cells in the storage cell pool according to a format of a storage cell in the storage cell pool, the acts further comprising:
       synchronizing the target data with the peer cache; and setting a peer state of the synchronized target data in the peer cache to "dirty" so as to indicate the synchronized target data in the peer cache are not yet flushed to the underlying storage system.

12. The apparatus of claim 11, wherein the acts further comprise:
serving a second access request with the cache including:
in response to determining the second access request is a read request,
obtaining a second virtual address from the read request;
determining whether data corresponding to the second virtual address exist in the cache or not;
in response to determining the data exist in the cache, reading the data from the cache; and
returning the read data so as to respond to the read request.

13. The apparatus of claim 11, wherein the acts further comprise:
serving a second access request with the cache including:
in response to determining the second access request is a read request,
obtaining a second virtual address from the read request:
determining whether data corresponding to the second virtual address exist in the cache or not:
in response to determining the data do not exist in the cache,
determining a physical address of the target data in the underlying storage system on the basis of the address mapping;
reading the target data from the physical address in the underlying storage system so as to load the read target data to the cache; and returning the read target data so as to respond to the read request.

14. The apparatus of claim 11, wherein the acts further comprise:
determining candidate data to be read by a next read request on the basis of a second access request; and
loading the candidate data to the cache from the underlying storage system.

15. The apparatus of claim 14, wherein loading the candidate data to the cache from the underlying storage system comprises:
obtaining a candidate address of the candidate data in the storage cell pool;
determining a physical address in the underlying storage system which corresponds to the candidate address on the basis of the address mapping; and
reading the candidate data from the physical address of the underlying storage system so as to load the read candidate data to the cache.

16. The apparatus of claim 11, wherein serving the access request with the cache comprises: in response to determining the access request is a write request,
writing the target data to the cache; and
setting a state of the target data in the cache to "dirty" so as to indicate the target data in the cache are not yet flushed to the underlying storage system.

17. The apparatus of claim 16, wherein the acts further comprise:
determining a physical address in the underlying storage system which corresponds to the virtual address on the basis of the address mapping; and
writing the target data to the physical address in the underlying storage system.

18. The apparatus of claim 17, wherein writing the target data to the physical address in the underlying storage system comprises:
flushing the target data in the cache to the physical address in the underlying storage system; and
setting the state to "clean" so as to indicate the target data in the cache have been flushed to the underlying storage system.

19. The apparatus of claim 11, wherein the acts further comprise:
setting the peer state to "clean" in response to the target data in the cache having been flushed to the underlying storage system.

20. The apparatus of claim 11, wherein the format of the storage cell in the storage pool is based on a predefined addressing scheme; and wherein the acts further comprise:
parsing the access request in accordance with the predefined addressing scheme to obtain the virtual address.

21. A computer program product having a non-transitory computer readable medium which stores a set of instructions to provide cache service in a storage system which includes a storage cell pool, a cache and an underlying storage system, the storage cell pool including multiple storage cells, a storage cell among the multiple storage cells being mapped to a physical address in the underlying storage system via an address mapping of the storage system; the set of instructions, when carried out by computerized circuitry, causing the computerized circuitry to perform a method of:
receiving an access request for target data at a virtual address in the storage cell pool;
determining the type of the access request, the type comprising a read request for reading the target data from the storage system and a write request for writing the target data to the storage system; and
serving the access request with the cache on the basis of the determined type, wherein the cache is used to cache data in at least one part of storage cells in the storage cell pool according to a format of a storage cell in the storage cell pool;
wherein the storage system further includes a peer cache, the peer cache being used to cache data in at least one part of storage cells in the storage cell pool according to a format of a storage cell in the storage cell pool, the method further comprising:
synchronizing the target data with the peer cache; and
setting a peer state of the synchronized target data in the peer cache to "dirty" so as to indicate the synchronized target data in the peer cache are not yet flushed to the underlying storage system.

22. The computer program product of claim 21, wherein the format of the storage cell in the storage pool is based on a predefined addressing scheme; and wherein the method further comprises:
parsing the access request in accordance with the predefined addressing scheme to obtain the virtual address.

* * * * *